United States Patent
Freisinger et al.

(10) Patent No.: US 7,448,982 B2
(45) Date of Patent: Nov. 11, 2008

(54) METHOD AND APPARATUS FOR SWITCHING ON AND OFF THE INTERNAL COMBUSTION ENGINE OF A VEHICLE

(75) Inventors: Normann Freisinger, Lorch (DE);
Juergen Lang, Backnang (DE);
Manfred Treusch, Freiberg (DE)

(73) Assignee: Daimler AG, Stuttgart (DE)

( * ) Notice: Subject to any disclaimer, the term of this patent is extended or adjusted under 35 U.S.C. 154(b) by 265 days.

(21) Appl. No.: 10/546,591

(22) PCT Filed: Jan. 23, 2004

(86) PCT No.: PCT/EP2004/000557

§ 371 (c)(1),
(2), (4) Date: Feb. 14, 2006

(87) PCT Pub. No.: WO2004/074678

PCT Pub. Date: Sep. 2, 2004

(65) Prior Publication Data
US 2006/0144361 A1 Jul. 6, 2006

(30) Foreign Application Priority Data
Feb. 21, 2003 (DE) ................. 103 07 377

(51) Int. Cl.
*B60W 10/06* (2006.01)
(52) U.S. Cl. .............. 477/181; 477/107; 477/171; 477/173
(58) Field of Classification Search ........... 477/107, 477/166, 170, 171, 173, 181
See application file for complete search history.

(56) References Cited

U.S. PATENT DOCUMENTS

| 4,768,635 | A | * | 9/1988 | Sakurai et al. ............... 477/169 |
| 4,817,776 | A | * | 4/1989 | Tateno et al. .................. 477/78 |
| 4,848,170 | A | * | 7/1989 | Inagaki et al. ..................... 74/6 |
| 4,899,857 | A | * | 2/1990 | Tateno et al. ................... 477/73 |
| 5,050,564 | A | * | 9/1991 | Suzuki et al. ................ 123/492 |
| 5,679,099 | A | * | 10/1997 | Kato et al. ................... 477/176 |
| 6,504,259 | B1 | * | 1/2003 | Kuroda et al. ............. 290/40 C |
| 6,656,090 | B2 | * | 12/2003 | Matsumura et al. ......... 477/171 |
| 7,090,615 | B2 | * | 8/2006 | Matsumura et al. ........... 477/78 |

FOREIGN PATENT DOCUMENTS

| DE | 42 29 024 A1 | 9/1992 |
| DE | 199 11 736 A1 | 3/1999 |
| DE | 100 48 015 A1 | 9/2000 |
| DE | 101 61 343 A1 | 12/2001 |
| DE | 33 06 519 A1 | 2/2003 |
| EP | 0989 299 A1 | 3/2000 |
| EP | 1 036 928 A2 | 9/2000 |
| FR | 2 816 891 | 11/2000 |

* cited by examiner

Primary Examiner—Ha D. Ho
(74) Attorney, Agent, or Firm—Crowell & Moring LLP

(57) ABSTRACT

A method and apparatus are provided for switching on and off the internal combustion engine which drives a vehicle by way of a manual transmission. The manual transmission is associated with a clutch for producing and releasing the frictional connection between the internal combustion engine and drive train. The clutch has a clutch operator for producing and releasing the frictional connection to the drive train. The clutch is actuable by a driver by way of a clutch pedal. A variable representing the engaging speed of the clutch operator is detected. If this variable exceeds a limit value, the starting of the internal combustion engine is interrupted.

13 Claims, 1 Drawing Sheet

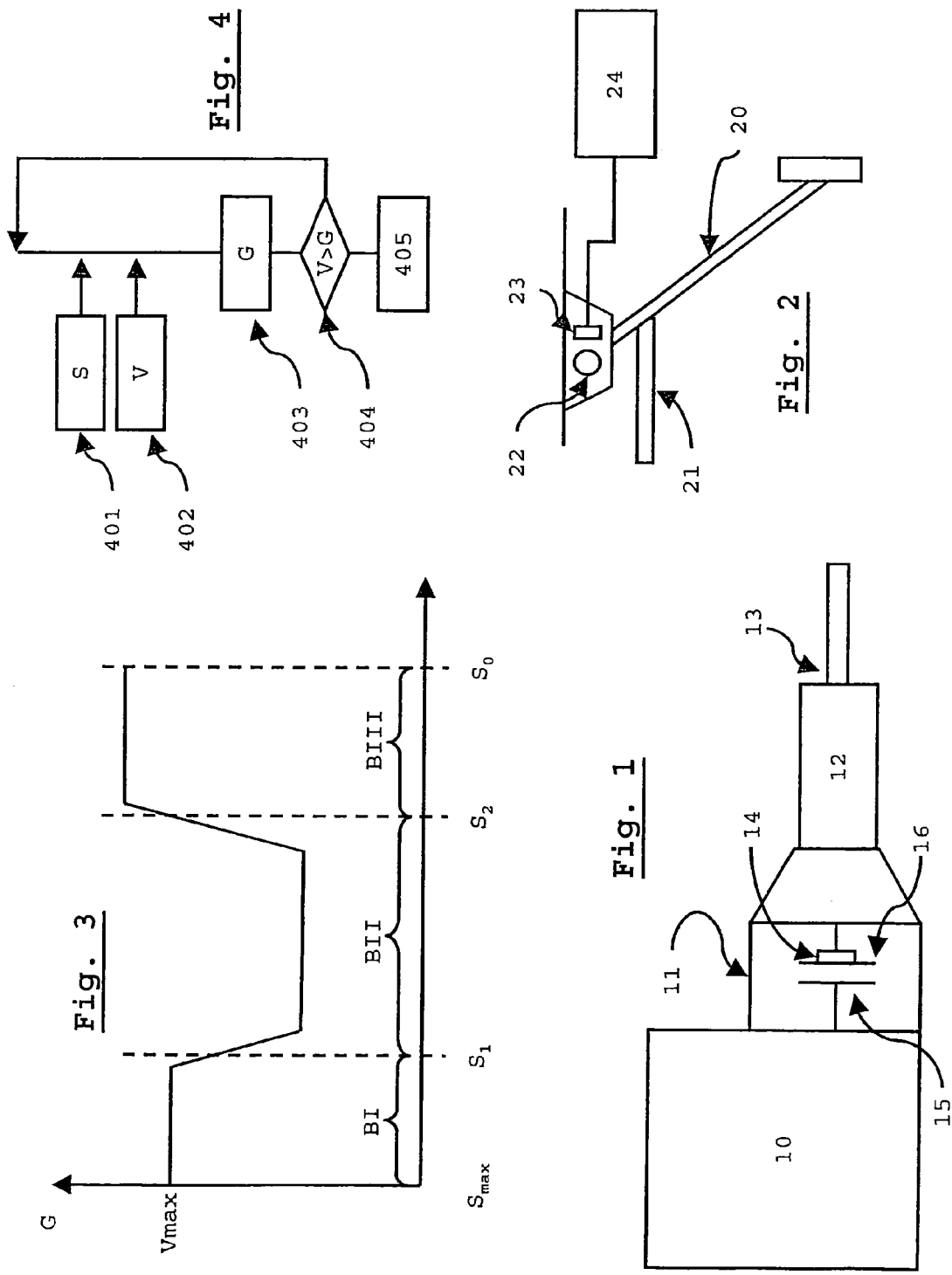

METHOD AND APPARATUS FOR SWITCHING ON AND OFF THE INTERNAL COMBUSTION ENGINE OF A VEHICLE

BACKGROUND AND SUMMARY OF THE INVENTION

The invention relates to a method and apparatus for switching on and off an internal combustion engine of a vehicle.

It is known, even during the normal driving mode of a vehicle, to automatically switch off the internal combustion engine and subsequently to switch it on again in certain operating states. The temporary shutting down of the internal combustion engine is used primarily to save fuel. Thus, for example, fuel is not consumed during a stop at a traffic light if the internal combustion engine is not in operation during this stationary period.

The recognition of a vehicle state suitable for switching off the internal combustion engine can take place in diverse ways. It is possible, in particular, to derive from the vehicle speed and states of actuation of the brake and/or the clutch pedal when switching off of the internal combustion takes place. The switching on again of the internal combustion engine also takes place automatically in accordance with criteria which have been established for measurable variables. In particular, the variables of actuation of the clutch pedal and/or actuation of the brake can be used as criterion for switching on the internal combustion engine again.

In this case, the switching on and off takes place automatically. The switching on again is to take place here in such a manner that a restarting of the vehicle can take place as far as possible without any delay.

The switching off and on of the internal combustion engine in certain driving states can also be carried out in the case of vehicles which have a manual transmission and a clutch arranged between the internal combustion engine and manual transmission. In this case, the clutch releases the frictional connection to the transmission and the drive train by means of a relative movement of a clutch operator relative to a flywheel mass connected to the output shaft of the internal combustion engine.

On the other hand, it may prove annoying if the driver slips off the actuated clutch at the moment at which the internal combustion is switched on and the clutch operator of the clutch produces the frictional connection to the drive shaft abruptly. This has the effect of subjecting the starter motor to a high load. In addition, this may result in the starting operation stalling. The vehicle may also start moving in an uncontrolled and jerky manner.

It is the object of the invention to avoid the occurrence of uncontrolled driving states during a starting operation when the internal combustion engine is automatically switched on and off.

This object is achieved according to the invention by a method for switch on and off an internal combustion engine of a vehicle connected to a drive train by means of a manual transmission, the manual transmission being associated with a clutch for producing and releasing the frictional connection between the internal combustion engine and drive train, the clutch having a clutch operator actuable by a driver by means of a clutch pedal, said method comprising a variable representing in engaging speed of the clutch operator and interrupting starting of the internal combustion engine if this variable exceeds a limit value.

In the case of a method for switching on and off the internal combustion engine of a vehicle, with an internal combustion engine for driving the same, the latter is connected to a drive train by means of a manual transmission. The manual transmission is associated with a clutch for producing and releasing the frictional connection between the internal combustion engine and drive train. The clutch has a clutch operator for producing and releasing the frictional connection to the drive train. The clutch is actuable by a driver by means of a clutch pedal. According to the invention, a variable representing the engaging speed of the clutch operator is detected. If this variable exceeds a limit value, the starting of the internal combustion engine is interrupted.

On account of the fact that the starting of the internal combustion engine is interrupted if the engaging speed of the clutch operator exceeds a limit value, the provision of driving power to the transmission and drive train by the internal combustion engine is prevented if this frictional connection is produced in an uncontrolled manner. The loading of clutch, drive train and internal combustion engine together with starter motor is reduced in this case. The vehicle can also be prevented from starting moving in an uncontrolled and jerky manner.

According to an advantageous refinement of the invention, the starting of the internal combustion engine takes place here on the basis of signals representing actuations of the brake pedal. The internal combustion engine of a vehicle is always switched on after having been automatically switched off if it is recognized that a driving of the vehicle is required. The intentional starting up of the vehicle by the driver can be recognized in diverse ways. This takes place particularly favorably as a function of an actuation of the clutch pedal or of the brake pedal or of a gas pedal.

According to an advantageous refinement of the invention, at least one of the variables of engaging speed, actuating speed of the clutch pedal or a variable coupled to one of these variables is detected as a measure for the engaging speed of the clutch operator. The engaging speed of the clutch operator can be detected both directly and indirectly. The detection via the actuation of the clutch pedal has the advantage that the sensor, for example a displacement sensor in the region of the articulation of the pedal, can be of simple design and simple to fit. On the other hand, a sensor of this type does not directly measure the behavior of the clutch operator. However, the behavior of the clutch operator is only indirectly associated with the behavior of the pedal. Thus, for example in the event of a disturbance in the functioning of the clutch pedal, the relationship to be assumed on account of the construction between the displacement of the clutch pedal and the displacement of the clutch operator may be disturbed and may no longer correspond to the actual relationships.

According to a further advantageous refinement of the invention, the limit value for the variable is predetermined as a function of the position of the clutch operator of the clutch. The specification of a displacement-variable limit value permits a different, displacement-dependent actuating behavior of the clutch to be taken into consideration. A driver who continually uses a vehicle knows his vehicle's performance. He unconsciously learns the relationship between the position of the clutch pedal and the force transmission taking place via the clutch. He knows in particular that position of the clutch pedal in which the frictional connection to the drive train is fully produced or fully released.

According to a continuing refinement, the limit value is greater in a first region, which extends between the completely released position of the clutch and the beginning of a frictional connection to the clutch operator, than the engaging speed of the clutch operator that occurs at maximum actuating speed of the clutch pedal. This measure makes it possible for the driver to guide the clutch pedal at maximum possible speed up to the point at which the "gripping" of the clutch begins and a frictional connection to the drive train is produced.

According to a corresponding advantageous development of the invention, in a third region of the positions of the clutch operator, in which region the clutch is slip-free, the limit value is selected to be at least as large as the maximum actuating speed of the clutch pedal. In this third region, the frictional connection between the internal combustion engine and the drive train is already produced. It is therefore no longer possible in this region to influence the force transmission. The actuating speed of the clutch pedal into its unactuated starting position is insignificant for the behavior of the system. The further movement of the clutch operator also no longer has any influence on the performance of the vehicle. The limit value can therefore be set at a very high value. It may, in particular, be selected to be at least the same size as the limit value for the first region.

According to a preferred refinement of the invention a second region is provided. This second region extends from the beginning of a frictional connection to the clutch operator as far as the slip-free connection being reached. In this second region, the limit value is lower than the maximum actuating speed of the clutch pedal. In this second region, in which the clutch takes on the actual work of producing a slip-free, frictional connection, the portion of force transmitted to the drive shaft is greatly dependent on the displacement of the clutch operator. In this region, too rapid a movement of the clutch operator results in too rapid a production of the frictional connection. In this situation, the internal combustion engine, shortly after starting when it has not yet reached a stable operating state, cannot yet apply a sufficient driving torque to drive the wheels. The build-up of torque is not of sufficient magnitude during the starting or directly after the starting. In order to avoid such an undesired state, a commensurately low limit value is selected. The limit value may be determined within a wide spectrum, in particular as a function of the behavior of the internal combustion engine. It can be determined, for example empirically, as a function of the structural conditions. In every case, the limit value is lower than the value of the take-back speed that occurs at maximum pedal speed. In particular, it amounts only to a fraction of this value. The value can be selected to be, in particular, between 10% and 50% of the maximum take-back speed of the clutch pedal. However, the precise selection of the value is a tuning matter which rests with the skilled person as a function of the vehicle conditions. The limit value may, in particular, also be selected to be changeable and, for example, fixed as a function of the pedal actuations executed by the driver.

According to a further refinement of the invention, the beginning of a frictional connection to the clutch operator is derived from at least one of the variables of rotational speed of the engine, rotational speed of the wheels, vehicle speed, vehicle acceleration, and driving torque at the drive shaft. The clutch displacement or the position of the clutch operator, in which the frictional connection to the transmission or to the drive train takes place, changes as a function of the use of the vehicle and the loading and wear of the clutch pedal. These variables permit the production of the frictional connection between the internal combustion engine and drive train to be established in a simple manner.

According to a further refinement of the invention, the beginning of a frictional connection is derived from speed changes of the clutch system. The production of the frictional connection changes the speed of movement of the clutch operator and of other movable components of the clutch with respect to one another. The detecting of such speed changes may also be used for establishing the production of the frictional connection.

The invention is furthermore explained in more detail with reference to the exemplary embodiment illustrated in the drawing.

BRIEF DESCRIPTION OF THE DRAWINGS

FIG. 1 shows, in a schematic illustration, an internal combustion engine with a clutch;

FIG. 2 shows, in a schematic illustration, a clutch pedal with a measuring device for detecting the actuating speed;

FIG. 3 shows, in a schematic illustration by way of example, the profile of the limit value over the pedal displacement; and FIG. 4 shows the flow diagram of a method according to the invention.

DETAILED DESCRIPTION OF THE DRAWINGS

FIG. 1 shows, in a schematic illustration, an internal combustion engine 10 which can be switched on and off automatically. Arranged downstream of the internal combustion engine 10 is a clutch 11 by means of which the frictional connection to the transmission 12 and the drive shaft 13 can be interrupted by actuation of a clutch pedal 20 (illustrated in FIG. 2). In this case, the clutch operator 14 is used to interrupt the force flux from the flywheel 15 of the internal combustion engine to a clutch plate 16.

FIG. 2 shows a clutch pedal 20, upon the actuation of which, for example via a Bowden cable 21, a transmission of the pedal displacement to the clutch 11 takes place and produces a pedal-displacement-dependent movement of the clutch operator 14. The pedal is held in a pivoting joint 22 which is arranged on the vehicle.

An angle sensor 23, the signals of which can be processed in the computing unit 24, is arranged on the pivoting joint 22, with it being possible to determine from these signals the position s and the speed of movement v and direction of movement of the clutch pedal 20.

FIG. 3 shows a diagram of a position-dependent determination of the limit value G for breaking off the switching on of the internal combustion engine 10. If the clutch pedal 20 is in a position s between the maximum actuating displacement $s_{max}$—in which there is no frictional connection of the internal combustion engine 10 to the drive shaft 13—and the position s1—in which a frictional connection of the internal combustion engine 10 to the drive shaft 13 is just produced—i.e. within the first region BI, then the maximum speed of movement $v_{max}$ of the clutch pedal is taken as the limit value G. In the second region BII, which extends from the region B1 as far as the position s2 of the clutch pedal, in which position the frictional connection is produced completely and in a slip-free manner, the limit value G is lower than $v_{max}$. In the third region BIII which reaches from the second region BII as far as the unactuated inoperative position $s_o$, the limit value is selected to be larger than in the first region BI.

In the embodiment illustrated, a continuous, differentiable transition between the limit values is provided between the regions, with the transition region preferably being situated outside the region BII.

FIG. 4 shows the flow diagram of a method according to the invention. According to step 401, the position s of the clutch pedal is determined first. At the same time, according to step 402, the determined speed of movement v of the clutch pedal or of the clutch operator of the clutch pedal is determined.

According to step 403, the limit value G for the current position s of the clutch operator 14 is determined. According to step 404, it is checked whether the speed of movement v is greater than the limit value G. If this is not the case, then a jump is made to step 401. Otherwise, according to step 405, the switching on of the internal combustion engine is interrupted.

The invention claimed is:

1. A method for switching on and off an internal combustion engine of a vehicle connected to a drive train by means of a manual transmission, the manual transmission being associated with a clutch for producing and releasing a frictional connection between the internal combustion engine and the drive train, the clutch having a clutch operator actuable by a driver by means of a clutch pedal, said method comprising:
   detecting a variable representing an engaging speed of the clutch operator and interrupting starting of the internal combustion engine if this variable exceeds a limit value.

2. The method as claimed in claim 1, wherein starting of the internal combustion engine is derived on the basis of signals representing actuations of a brake pedal.

3. The method as claimed in claim 1, wherein at least one of the variables of engaging speed of the clutch operator, actuating speed of the clutch pedal, or a variable coupled to one of these variables is detected as a measure for the engaging speed.

4. The method as claimed in claim 1, wherein the beginning of a frictional connection to the clutch operator is derived from at least one of the variables of rotational speed of the engine, rotational speed of the wheels, vehicle speed, vehicle acceleration, and driving torque at a drive shaft.

5. The method as claimed in claim 1, wherein the beginning of a frictional connection to the clutch operator is derived from speed changes of the clutch operator.

6. The method as claimed in claim 4, wherein the beginning of a frictional connection to the clutch operator is derived from speed changes of the clutch operator.

7. A method for switching on and off an internal combustion engine of a vehicle connected to a drive train by means of a manual transmission, the manual transmission being associated with a clutch for producing and releasing a frictional connection between the internal combustion engine and the drive train, the clutch having a clutch operator actuable by a driver by means of a clutch pedal, said method comprising:
   detecting a variable representing an engaging speed of the clutch operator and interrupting starting of the internal combustion engine if this variable exceeds a limit value, wherein the limit value is predetermined as a function of a position of the clutch operator of the clutch.

8. The method as claimed in claim 7, wherein the limit value is greater in a first region, which extends between a completely released position of the clutch and beginning of a frictional connection to the clutch operator, than an engaging speed of the clutch operator that occurs at maximum actuating speed of the clutch pedal.

9. The method as claimed in claim 7, wherein movement of said clutch includes:
   a first region extending between a completely released position of the clutch and beginning of a frictional connection between said engine and said transmission,
   a second region extending between the beginning of said frictional connection to a slip-free connection between said engine and said transmission, and
   a third region with said slip free connection.

10. The method as claimed in claim 9, wherein in the third region, in which region the clutch is slip-free, the limit value is at least as large as a maximum engaging speed of the clutch operator.

11. The method as claimed in claim 9, wherein in the second region, the limit value is lower than a maximum engaging speed of the clutch operator.

12. The method as claimed in claim 11, wherein in the second region, the limit value is a fraction of the limit value of an adjacent region.

13. The method as claimed in claim 11, wherein the limit value is predetermined in a changeable manner in the second region.

* * * * *